United States Patent [19]
Young

[11] Patent Number: 5,876,295
[45] Date of Patent: Mar. 2, 1999

[54] ROLLER CHAIN DRIVE SYSTEM HAVING IMPROVED NOISE CHARACTERISTICS

[75] Inventor: James D. Young, Chesaning, Mich.

[73] Assignee: Cloyes Gear and Products, Inc., Mentor, Ohio

[21] Appl. No.: 787,675

[22] Filed: Jan. 23, 1997

Related U.S. Application Data

[60] Provisional application No. 60/010,435 Jan. 23, 1996 and provisional application No. 60/018,385 May 29, 1996.

[51] Int. Cl.[6] .................................................. F16H 7/06
[52] U.S. Cl. ............................................. 474/156; 474/157
[58] Field of Search .................................. 474/152, 156, 474/157

[56] References Cited

U.S. PATENT DOCUMENTS

| | | |
|---|---|---|
| Re. 30,018 | 6/1979 | Clemens et al. .................... 74/243 R |
| 320,734 | 6/1885 | Whiteley . |
| 536,813 | 4/1895 | MacPhail et al. . |
| 698,991 | 4/1902 | Morse . |
| 717,976 | 1/1903 | Dodge . |
| 984,509 | 2/1911 | Crowder . |
| 1,630,313 | 5/1927 | Rorabeck . |
| 1,808,369 | 6/1931 | Munroe . |
| 2,382,740 | 8/1945 | Noffsinger . |
| 2,385,923 | 10/1945 | Klaucke et al. ...................... 474/157 |
| 2,934,200 | 4/1960 | Fletcher et al. . |
| 3,130,791 | 4/1964 | Schmidt . |
| 3,194,609 | 7/1965 | Thurlow ............................... 305/57 |
| 3,298,406 | 1/1967 | Erickson . |
| 3,377,875 | 4/1968 | Sand . |
| 3,448,629 | 6/1969 | Pfrank et al. . |
| 3,495,468 | 2/1970 | Griffel . |
| 3,604,755 | 9/1971 | Krekeler ............................... 299/84 |
| 3,824,869 | 7/1974 | Murphy ............................. 74/243 R |
| 3,956,943 | 5/1976 | Yamasaki ........................... 74/243 R |
| 4,016,772 | 4/1977 | Clemens et al. .................... 74/243 R |
| 4,036,071 | 7/1977 | McKnight et al. ................. 74/243 R |
| 4,089,406 | 5/1978 | Teske et al. ......................... 198/730 |
| 4,099,423 | 7/1978 | Mullins ................................ 74/243 |
| 4,116,081 | 9/1978 | Luttrell et al. ....................... 74/243 |
| 4,168,634 | 9/1979 | Griffel ................................. 74/243 |
| 4,174,642 | 11/1979 | Martin et al. ..................... 74/243 R |
| 4,181,033 | 1/1980 | Nagano ............................. 74/243 R |
| 4,200,000 | 4/1980 | Fluehmann ........................... 74/437 |
| 4,207,777 | 6/1980 | Fluehmann ........................... 74/462 |
| 4,274,184 | 6/1981 | Nordtvedt ......................... 29/121.1 |
| 4,294,132 | 10/1981 | Matusz ................................ 74/462 |
| 4,378,965 | 4/1983 | Ishii et al. .......................... 474/161 |
| 4,401,420 | 8/1983 | Kasuya et al. .................... 418/201 |
| 4,492,030 | 1/1985 | Beerens ................................ 30/384 |
| 4,521,207 | 6/1985 | Husted ................................. 474/56 |

(List continued on next page.)

FOREIGN PATENT DOCUMENTS

| | | | |
|---|---|---|---|
| 515906 | 5/1976 | U.S.S.R. .......................... 474/156 |
| 595565 | 2/1978 | U.S.S.R. .......................... 474/152 |

OTHER PUBLICATIONS

International Standard ISO 606:1994(E), entitled "Short--pitch transmission precision roller chains and chain wheels." (19 pgs.).

DE–vol. 46, Mechanical Design and Synthesis ASME 1992, entitled "On The Dynamic Analysis Of Roller Chain Drives: Part 1—Theory." (pp. 431–439).

*Primary Examiner*—William Stryjewski
*Attorney, Agent, or Firm*—Fay, Sharpe, Beall, Fagan, Minnich & McKee

[57] ABSTRACT

A unidirectional roller chain system for use primarily in automotive engine camshaft drive applications wherein the tooth profile of the sprockets are modified for noise reduction. This new tooth profile is asymmetrical with flank radii that may differ from the drive side to the coast side of the tooth. This configuration lowers the overall noise level of the chain drive system by reducing the engagement impact energy as the sprocket collects a roller from the span, and maintaining the chain rollers in hard contact with the root surface in the sprocket wrap.

24 Claims, 18 Drawing Sheets

U.S. PATENT DOCUMENTS

| | | | |
|---|---|---|---|
| 4,522,611 | 6/1985 | Hiatt | 474/162 |
| 4,531,926 | 7/1985 | Reeves, Jr. | 474/49 |
| 4,559,028 | 12/1985 | Reeves, Jr. | 474/162 |
| 4,571,218 | 2/1986 | Reeves, Jr. | 474/49 |
| 4,653,340 | 3/1987 | LaBate | 74/462 |
| 4,758,209 | 7/1988 | Ledvina | 474/156 |
| 4,813,916 | 3/1989 | Valin | 474/152 |
| 4,889,521 | 12/1989 | Nagano | 474/164 |
| 4,911,032 | 3/1990 | Steele et al. | 74/462 |
| 4,915,604 | 4/1990 | Nagai | 418/201 |
| 4,915,675 | 4/1990 | Avramidis | 474/213 |
| 4,969,371 | 11/1990 | Allen | 74/462 |
| 5,022,280 | 6/1991 | Boiko et al. | 74/462 |
| 5,073,151 | 12/1991 | Nagano | 474/160 |
| 5,123,878 | 6/1992 | Nagano | 474/160 |
| 5,133,695 | 7/1992 | Kobayashi | 474/160 |
| 5,154,674 | 10/1992 | Avramidis et al. | 474/214 |
| 5,162,022 | 11/1992 | Kobayashi | 474/150 |
| 5,163,826 | 11/1992 | Cozens | 418/170 |
| 5,318,483 | 6/1994 | Reid et al. | 474/152 |
| 5,397,278 | 3/1995 | Suzuki et al. | 474/156 |
| 5,437,582 | 8/1995 | Romano | 474/156 |
| 5,503,598 | 4/1996 | Neuer et al. | 474/78 |

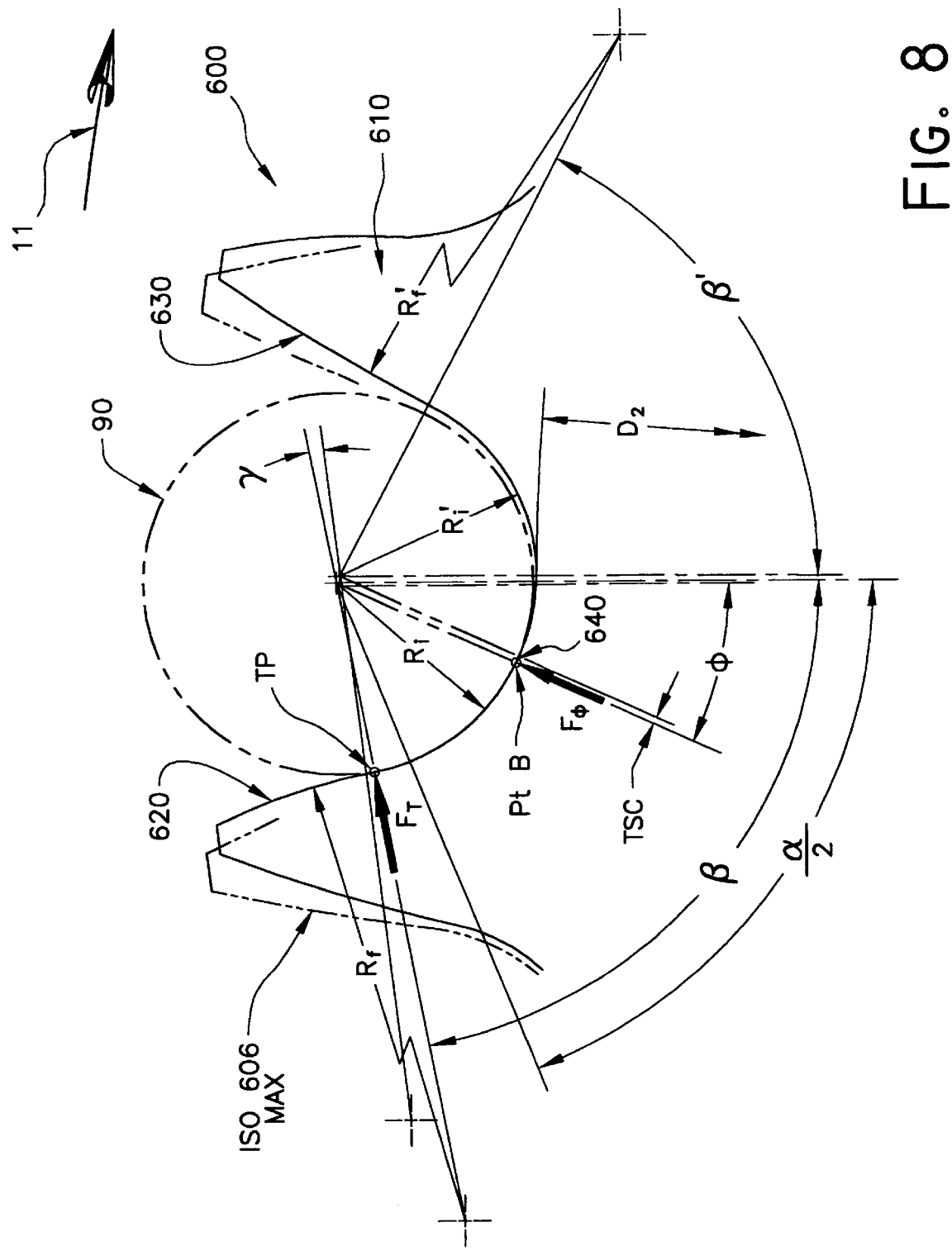

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 15
PRIOR ART

ASYMMETRICAL

| | | 1 | | 2 | | 3 | |
|---|---|---|---|---|---|---|---|
| Z | A | β (MAX) | γ (MIN) | β (MAX) | γ (MIN) | β (MAX) | γ (MIN) |
| 18 | 20.000 | 73.75 | 6.25 | 76.92 | 3.08 | 80.00 | 0 |
| 19 | 18.947 | 74.08 | 6.45 | 77.29 | 3.24 | 80.53 | 0 |
| 20 | 18.000 | 74.38 | 6.63 | 77.62 | 3.38 | 81.00 | 0 |
| 21 | 17.143 | 74.64 | 6.79 | 77.92 | 3.51 | 81.43 | 0 |
| 22 | 16.364 | 74.89 | 6.93 | 78.19 | 3.63 | 81.82 | 0 |
| 23 | 15.652 | 75.11 | 7.07 | 78.43 | 3.74 | 82.17 | 0 |
| 24 | 15.000 | 75.31 | 7.19 | 78.66 | 3.84 | 82.50 | 0 |
| 25 | 14.400 | 75.50 | 7.30 | 78.87 | 3.93 | 82.80 | 0 |
| 26 | 13.846 | 75.67 | 7.40 | 79.06 | 4.02 | 83.08 | 0 |
| 27 | 13.333 | 75.83 | 7.50 | 79.24 | 4.09 | 83.33 | 0 |
| 28 | 12.857 | 75.98 | 7.59 | 79.41 | 4.17 | 83.57 | 0 |
| 29 | 12.414 | 76.12 | 7.67 | 79.56 | 4.23 | 83.79 | 0 |
| 30 | 12.000 | 76.25 | 7.75 | 79.70 | 4.30 | 84.00 | 0 |

Fig. 16

ROLLER CHAIN DRIVE SYSTEM HAVING IMPROVED NOISE CHARACTERISTICS

CROSS REFERENCE TO RELATED APPLICATIONS

This application claims the benefit of U.S. provisional application Ser. No. 06/010,435, filed Jan. 23, 1996, and U.S. provisional application Ser. No. 06/018,385, filed May 29, 1996.

BACKGROUND OF THE INVENTION

This invention relates to roller chain drives for use in automotive engine chain drive systems that reduces the noise level normally associated with chain drives. More particularly, the invention is directed to a roller chain sprocket having an asymmetrical tooth profile that attempts to minimize the impact noise generated by the chain-sprocket collision during meshing.

While the invention is particularly directed to the art of roller chain sprockets for use in automotive engine camshaft drive applications, and thus will be described with specific reference thereto, it will be appreciated that the invention may have utility in other fields and applications.

Roller chain sprockets used in camshaft drives for automotive engines are typically manufactured to the International Standard ISO 606-1994(E). As shown in FIG. 1, the ISO 606 tooth profile is symmetrical with respect to the tooth space and has a constant root or roller seating radius $R_i$ extending from one tooth flank to the adjacent tooth flank as defined by the roller seating angle $\alpha$. Accordingly, the flank radius $R_f$ is tangent to the roller seating radius $R_i$ at the tangency point TP. A chain with a link pitch P has rollers of diameter $D_1$ in contact with a sprocket having a chordal pitch of P, a root diameter $D_2$ and Z number of teeth. The pitch circle diameter PD, tip or outside diameter OD, and tooth angle A (equal to $360°/Z$) further define the ISO-606 compliant sprocket.

FIG. 2 shows a typical cam-in-block ISO-606 compliant roller standard chain drive system 10, without a tensioner or chain guide, rotating in a clockwise direction as shown by arrow 11. The chain drive system 10 is comprised of a 25-tooth drive sprocket 20, a 50-tooth driven sprocket 30 and roller chain 40 having rollers 42. The roller chain 40 engages and wraps about sprockets 20 and 30 and has two spans extending between these sprockets, slack strand 44 and taut strand 46. The chain is under tension as shown by arrows 50, and distance D separates the centers of sprockets 20 and 30.

It is believed that a worn chain meshing with an ISO standard sprocket will have only one roller in driving contact and loaded at a maximum loading condition. This contact at maximum loading occurs as the roller enters the drive sprocket wrap 60 at engagement, shown in FIG. 2 as engaging roller 52. A second roller 54 is adjacent to the first roller 52 and is the next roller to mesh with the drive sprocket 20. The loading for roller 52 is composed primarily of the meshing impact loading and a major part of the chain tension 50 loading. The next several rollers in the wrap 60 forward of roller 52 share in the chain tension loading, but at a progressively decreasing rate. This loading of the roller 52 (and to a lesser extent for the next several rollers in the wrap) serves to maintain a solid or hard contact of the roller with the sprocket tooth surface. Roller 56, the last roller in the drive wrap 60 just prior to entering the slack strand 44, will also be in hard contact with drive sprocket 20, but at some point higher up on the root surface 22. With exception of rollers 52 and 56, and the several rollers following roller 52 that share the chain tension loading, the remaining rollers will not be in hard contact with the sprocket teeth and will be free to vibrate against the sprocket tooth surface as they travel around the wrap, contributing to the broadband mechanical noise level.

For the driven sprocket 30, the last roller in the wrap before it enters the taut strand, roller 59 in FIG. 2, is the roller in driving contact with the sprocket 30 at a maximum loading condition. And similar to the last roller in the drive sprocket wrap 60, roller 56, engaging roller 58 will be in hard contact with the root radius 32 of driven sprocket 30, but generally not at the root diameter.

It is known that a system such as that shown in FIG. 2 will gradually wear during ordinary use. This wear is comprised of sprocket tooth face wear and chain wear. Chain wear can be characterized as pitch elongation. Since a worn chain has an increased pitch length, a corresponding increase in the sprocket pitch diameter is a preferred interface for a worn chain.

Chain drive systems, including those using the ISO 606 compliant sprockets, have several components of undesirable noise. A major component of chain drive noise is the noise generated as the chain roller leaves the span and collides with the sprocket during meshing. At meshing, the roller will have a radial impact component as it collides with the sprocket tooth at its root, and a tangential impact component as it collides with the engaging tooth flank. It is appreciated that the loudness of the impact noise will be a function of the impact energy that must be absorbed during meshing. This impact energy is related to engine speed, chain mass, and the chain-sprocket engagement geometry, of which the engaging flank pressure angle is a major factor. The resultant meshing impact sound is repeated with a frequency generally equal to that of the frequency of the chain meshing with the sprocket.

Another source of chain drive noise is the broadband mechanical noise caused in part by shaft torsional vibrations and slight dimensional inaccuracies between the chain and the sprockets. Contributing to a greater extent to broadband noise level is the intermittent or vibrating contact between the unloaded rollers and the sprocket teeth as the rollers travel around the wrap.

It is known that providing tooth space clearance between sprocket teeth promotes hard contact between the chain rollers and sprocket in the sprocket wrap, even as the chain wears. This has the effect of reducing broadband mechanical noise component of the overall chain drive system noise. Adding tooth space clearance between sprocket teeth does not, however, reduce chain drive noise caused by the impact of roller-sprocket engagement.

Accordingly, there is a need for a chain drive system that will reduce the noise caused by the impact of the chain rollers during sprocket engagement. The present invention satisfies this and other needs associated with conventional chain drive systems. For example, the present invention will utilize an asymmetrical tooth profile with a decreased pressure angle for the engaging flank to reduce the roller-sprocket tangential impact force and the resultant noise level associated with the tangential roller impact. This asymmetrical tooth profile will also utilize a reduced roller seating angle at the disengaging flank to promote faster roller-sprocket separation as the roller exits the sprocket wrap. This reduced roller seating angle will also beneficially maintain the rollers in solid or hard contact with the sprocket tooth surface while the rollers are in the wrap, thereby contributing to a reduced broadband mechanical noise level. For the preferred embodiments of the present invention, an inclined root surface is used to incorporate tooth space clearance to beneficially reduce the roller-sprocket radial impact force and the resultant noise level associated with radial roller impact. The inclined root surface will also beneficially maintain the roller-sprocket hard contact even as the chain pitch elongates with wear, further contributing to a reduced broadband mechanical noise level. Other needs satisfied by the present invention will become apparent to the skilled artisan from the discussion of the preferred embodiments.

SUMMARY OF THE INVENTION

The principal object of this invention is to provide a roller chain and sprocket drive system that reduces noise levels normally associated with chain drives by reducing the chain-sprocket engagement impact energy as the sprocket collects the rollers from the span. The present invention achieves this object by providing a sprocket having an asymmetrical tooth profile, each sprocket tooth comprising an engaging flank (which is also the drive flank for a driving sprocket), a disengaging flank (or coast flank for the same driving sprocket) opposite to the engaging flank of an adjacent tooth and an inclined root surface tangent to root radii that are disposed between the engaging and disengaging flanks of adjacent sprocket teeth.

In one aspect of the invention, the optimized engaging flank pressure angle is beneficially decreased to reduce the tangential roller engagement force, thereby reducing the chain mesh impact noise contribution to the overall noise level.

In another aspect of the invention, the inclined root surface defines an increasing or "uphill" root surface moving from the engaging flank of one tooth to the disengaging flank of the adjacent tooth.

In another aspect of the invention, the inclined root surface defines a decreasing or "downhill" root surface moving from the engaging flank of one tooth to the disengaging flank of the adjacent tooth.

In another aspect of the invention, the roller seating angle for the disengaging side is optimally reduced to promote faster separation of the roller from the sprocket as the roller leaves the sprocket to enter the span. It is also believed that this feature promotes hard contact between the rollers and the sprocket.

In another aspect of the invention, tooth space clearance enables the rollers of a chain to maintain hard contact with the sprocket teeth as the rollers travel round the wrap, thereby reducing the broadband mechanical noise generated by the chain drive.

Another advantage of the invention is that as the chain wears and the chain pitch elongates, the inclined root surface serves to move the roller radially outward, effectively locating the roller closer to the preferred pitch circle.

Another advantage of the invention is that for a sprocket incorporating the "uphill" root surface feature, the inclined root surface requires less tooth thinning for the same amount of tooth space clearance.

Another advantage of the invention is that for a given quantity of tooth space clearance and associated tooth thickness for a sprocket incorporating the "uphill" root surface feature, the asymmetrical tooth profile design will be stronger than pitch line clearance for conventional sprockets, which use a constant root diameter.

Another advantage of the invention is that the asymmetrical sprocket tooth profile with the downhill inclined surface reduces the radial reaction force, thereby reducing the roller radial impact mesh noise contribution to the overall noise level.

Further scope of the applicability of the present invention will become apparent from the detailed description provided below. It should be understood, however, that the detailed description and specific examples, while illustrating preferred embodiments of the invention, are given by way of illustration only, since various changes and modifications within the spirit and scope of the invention will be apparent to those skilled in the art.

DESCRIPTION OF THE DRAWINGS

The present invention exists in the construction, arrangement and combination of various elements, whereby the objects contemplated are attained as hereinafter more fully set forth, specifically pointed out in the claims, and illustrated in the accompanying drawings in which:

FIG. 8 shows selected portions of an asymmetrical profile for a 25-tooth driving sprocket having a "downhill" inclined root surface;

FIG. 15 is a table showing maximum and minimum roller seating and pressure angles for several ISO-606 compliant roller chain sprockets; and FIG. 16 is a table showing pressure angles of various asymmetrical tooth profiles in relation to roller seating angles β.

DETAILED DESCRIPTION OF THE PREFERRED EMBODIMENTS

Figure 3:
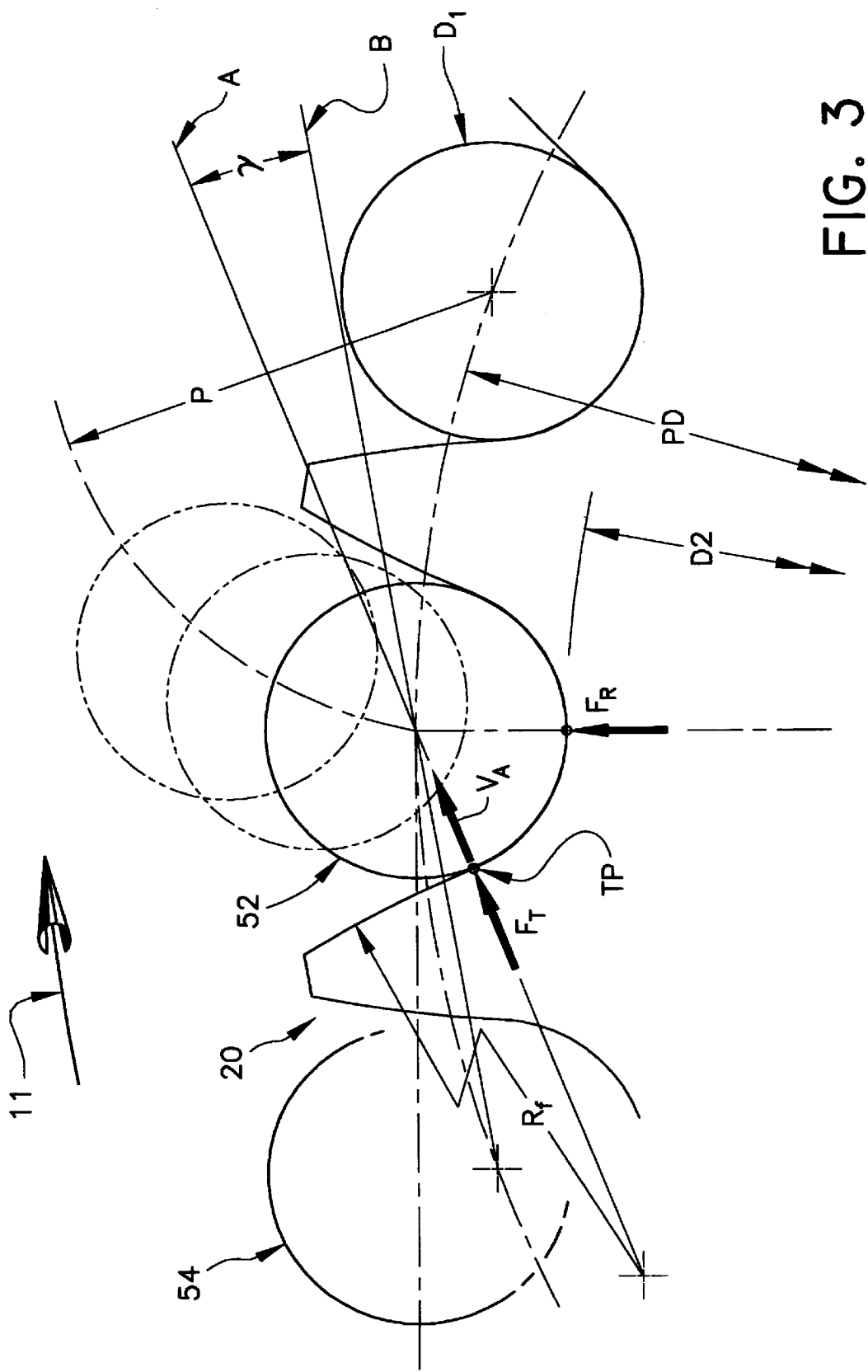
FIG. 3 illustrates the variables considered in determining the impact energy that must be absorbed at the onset of roller and sprocket meshing.

Referring now to the drawings, which are for purposes of illustrating the preferred embodiments of the invention only and not for purposes of limiting the same, FIG. 3 shows variables that affect roller-sprocket impact noise. Specifically, this impact noise is related to the roller impact energy $E_A$ (in Nm) occurring during the chain (roller) and sprocket meshing process:

$$E_A = \frac{wP}{2000} V_A^2, \text{ where}$$

$$V_A = \frac{\pi n P}{30000} \sin\left(\frac{360}{Z} + \gamma\right),$$

$$\gamma = \frac{180 - A - \alpha}{2}, \text{ and}$$

$V_A$ = Roller Impact Velocity [m/s]
$\gamma$ = engaging flank Pressure Angle
$n$ = Enine Speed [RPM]
$w$ = Chain Mass [Kg/m]
$Z$ = Number of Sprocket Teeth
$A$ = Tooth Angle (360°/Z)
$\alpha$ = Roller Seating Angle
$P$ = Chain Pitch (Chordal Pitch)

The $E_A$ equation presumes the chain drive kinematics will conform generally to a quasi-static analytical model and that the roller-sprocket driving contact will occur at the tangency point TP for the flank and root radii as the sprocket collects a roller from the span.

It is appreciated that reducing the pressure angle γ of the sprocket improves the noise, vibration, and harshness (NVH) characteristics associated with the chain drive. FIG. 15 shows, for several ISO sprockets, the maximum and minimum pressure angles γ as a function of tooth angle A and maximum and minimum roller seating angles α. One example, graphically illustrated in FIG. 3, shows a symmetrical 25-tooth maximum ISO-606 compliant sprocket 20 having a pressure angle γ which is defined as the angle between a line A extending from the center of the engaging roller 52, when it is contacting the engaging tooth flank at the tangency point TP, through the center of the flank radius $R_f$ and a line B connecting the centers of the full seated roller 52, when it is seated on root diameter $D_2$, and the center of the next meshing roller 54 as if it were also seated on root diameter $D_2$ in its engaging tooth space. The 25-tooth sprocket 20 of FIG. 3 will have a pressure angle γ in the range of 14.6° to 24.6° as listed in the table of FIG. 15.

FIG. 3 also shows the engagement path (phantom rollers) and the meshing contact position of roller 52 (solid) as the drive sprocket 20 rotates in the direction of arrow 11. FIG. 3 depicts the theoretical case with chain roller 52 seated on root diameter $D_2$ of a maximum material sprocket with both chain pitch and sprocket chordal pitch equal to theoretical pitch P. For this theoretical case, the noise occurring at the onset of roller engagement has a radial component $F_R$ as a result of roller 52 colliding with the root surface $R_i$ and a tangential component $F_T$ generated as the same roller 52 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangency point TP with roller 52 in driving contact at point TP.

The impact energy ($E_A$) equation accounts only for a tangential roller impact during meshing. The actual roller engagement, presumed to have tangential and radial impacts (occurring in any order), would therefore seem to be a variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial roller-sprocket collision during the engagement process, and its effect on the overall meshing noise levels, must be evaluated apart from the impact energy ($E_A$) equation. The evaluation has taken the form of firing engine NVH testing that compared the noise levels of sprockets having the standard ISO-606 tooth profile to sprockets having asymmetrical tooth profiles.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$, but not necessarily at $D_2$. The tangential collision will normally be in the proximity of point TP, but this contact could take place high up on the engaging side of root radius $R_i$ or even radially outward from point TP on the engaging flank radius $R_f$, as a function of the actual chain-sprocket pitch mismatch.

Figure 4:
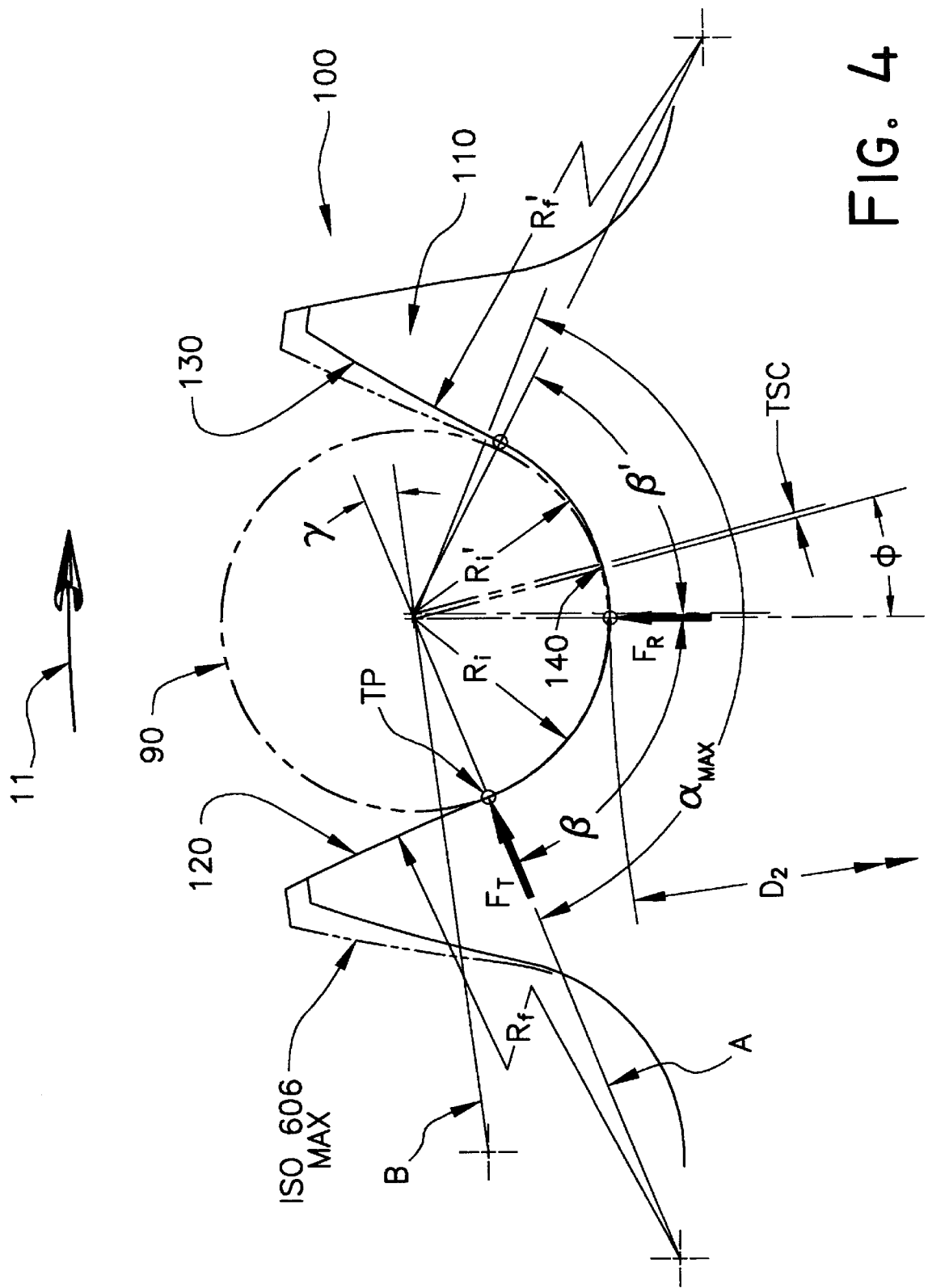
FIG. 4 shows selected portions of an asymmetrical profile for a 25-tooth driving sprocket having an "uphill" inclined root surface that fits within the ISO profile envelope.

FIG. 4 shows selected portions of an asymmetrical profile for a 25-tooth driving sprocket 100 of the present invention collecting a roller 90 from the taut strand of a roller chain (not shown) as it rotates in the direction of arrow 11. Each tooth 110 of sprocket 100 has an engaging flank 120 and a disengaging flank 130. The roller 90 enters into engagement with the sprocket 100 and seats on the root defined by roller seating radius $R_i$. The engaging flank radius $R_f$ and the roller seating radius $R_i$ that is tangent to it satisfy the ISO 606 tooth profile specifications. The ISO symmetrical profile and the asymmetrical engaging side profile of the present embodiment are identical at maximum material conditions. As such, a maximum roller seated at the root diameter $D_2$ would have its center on the theoretical pitch circle.

Roller seating radius $R_i$ is also tangent to an inclined root surface 140, at its radially outward, or upper end which defines a tooth space clearance TSC. Inclined root surface 140 is a flat surface of a finite length that can be inclined at any angle φ needed to satisfy a specific geometry or to compensate for a given amount of pitch elongation. Inclined root surface angle φ is measured from a line passing through the arc center of $R_i$ and the sprocket center to a second line passing through that arc center and normal to the lower edge of inclined root surface 140. The disengaging flank roller seating or root radius $R_i'$ is also tangent to the inclined root surface 140.

While root radii $R_i$ and $R_i'$ will typically have the same magnitude in this arrangement, the engaging flank radius $R_f$ and disengaging flank radius $R_f'$ may have different values.

Referring again to FIG. 4, engaging side roller seating angle β and disengaging side roller seating angle β' replace the symmetrical ISO roller seating angle α. The tolerances for angles β and β' are beneficially reduced such that the total tolerance for β and β' does not exceed one-half the tolerance for ISO roller seating angle α. A maximum value for angle β will be equal to the ISO $\alpha_{max}/2$, where $\alpha_{max} = 140° - 90°/Z$, or 136.4° for a 25-tooth sprocket. Likewise, a minimum value for angle $\beta'$ will equal ISO $\alpha_{min}/2$, where $\alpha_{min}=120°-90°/Z$.

For the sprocket geometry illustrated in FIG. 4, pressure angle $\gamma$ is related to $\beta$. For the drive side profiles of this 25-tooth drive sprocket 100, the ISO maximum (shown in phantom lines) and the asymmetrical maximum are identical and overlap when rotated into alignment. However, as shown in FIG. 4, the outside diameter of the asymmetrical sprocket 100 is truncated.

As with the pressure angle $\gamma$, the tangential impact force component $F_T$ (but not the radial impact force $F_R$) shown in FIG. 4 is proportional to the roller impact velocity $V_A$. According to the present invention, a maximum engaging side roller seating angle $\beta$ will minimize the pressure angle $\gamma$ at chain engagement for the tooth collecting the roller from the span. This will also reduce the tangential impact force component $F_T$ and thus the impact noise contribution to the overall noise level.

Roller seating angles $\beta'$ and $\beta$ of FIG. 4 could be equivalent. However, it is believed to be advantageous to have a maximum value for angle $\beta'$, which is equal to $\alpha_{min}/2$. This reduced seating angle $\beta'$ serves to promote faster separation when the roller leaves the sprocket and enters the span, and it also helps to maintain "hard" roller-sprocket contact for rollers in the wrap. Accordingly, disengaging side roller seating angle $\beta'$ is shown to be a minimum angle.

Figure 4A:
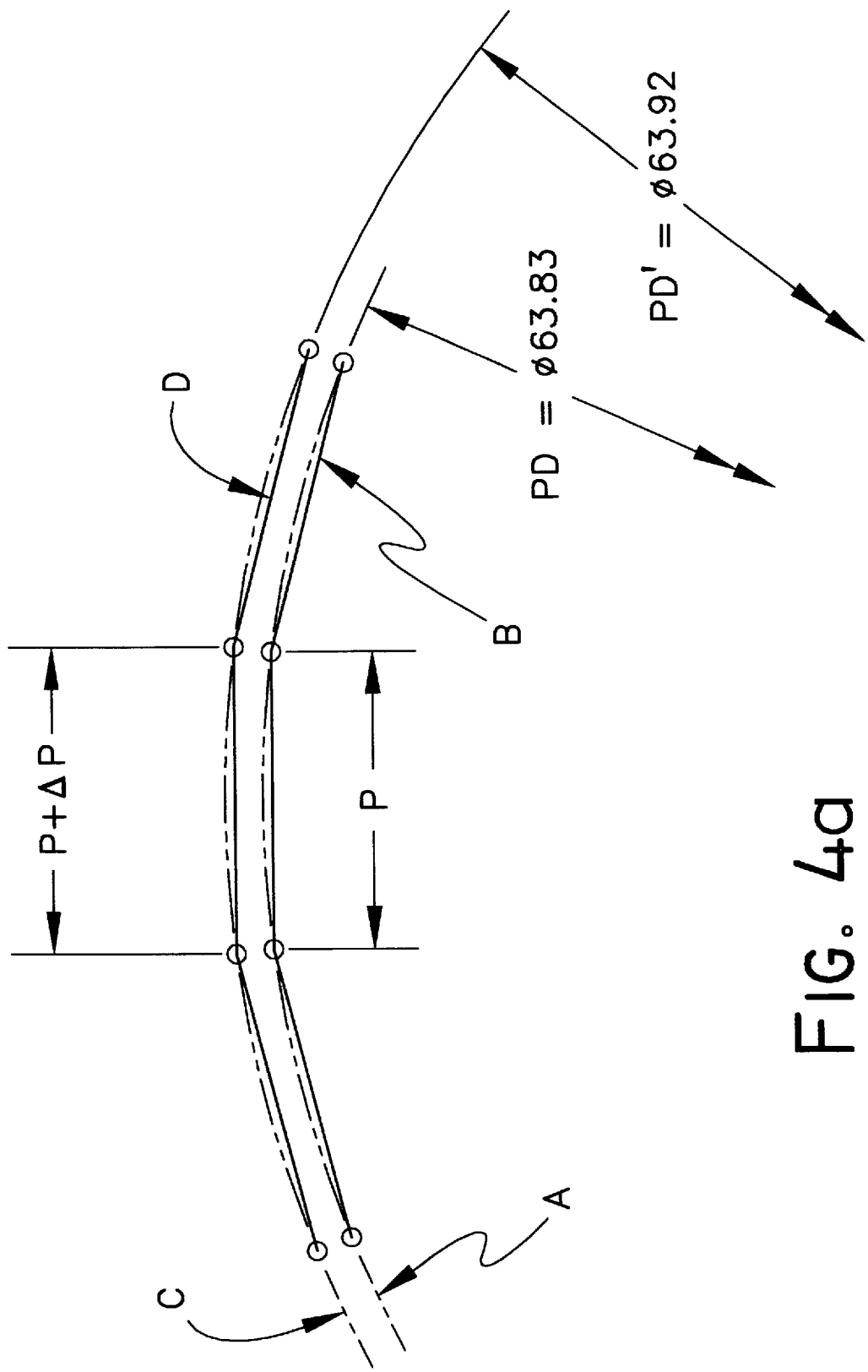
FIG. 4a shows the pitch circle and pitch polygon for the sprocket of FIG. 4.

FIG. 4a shows a portion of a pitch circle A and related pitch polygon B for the theoretical pitch P (maximum) of the 25-tooth 8 mm pitch sprocket of FIG. 4. It also shows the pitch circle C and pitch polygon D for a sprocket with a slightly longer chordal pitch P+$\Delta$P, demonstrating the preferred sprocket interface for a worn chain. When the roller 90 in FIG. 4 moves up the inclined root surface 140, its center defines a new pitch circle that is greater than the theoretical pitch circle. The amount that the pitch circle increases as roller 90 moves radially outward up the inclined root surface 140 is a function of the inclined root surface angle $\phi$ and the amount of tooth space clearance TSC.

Figure 5:
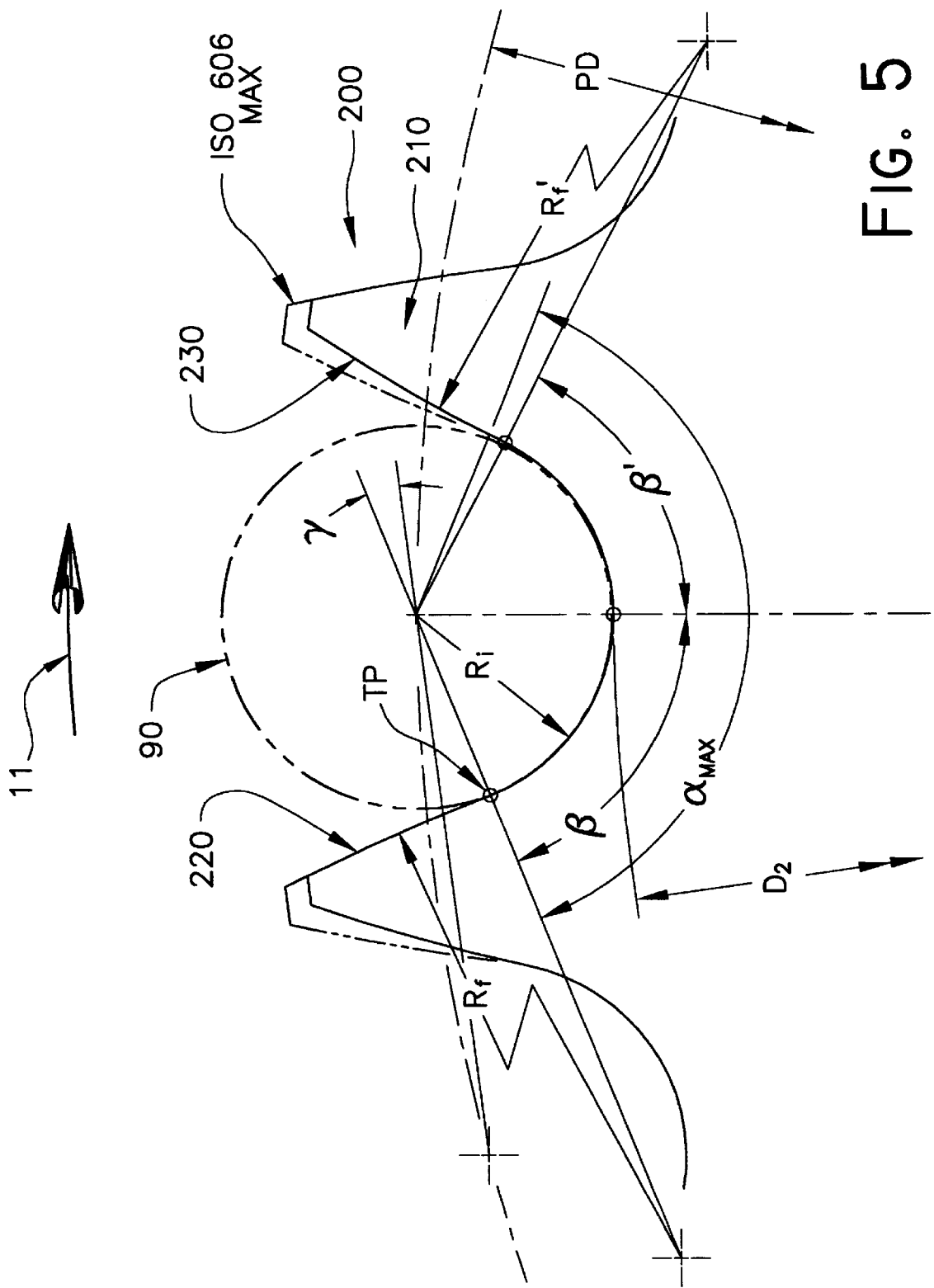
FIG. 5 shows selected portions of an asymmetrical tooth profile for a 25-tooth sprocket without the inclined root surface feature.

FIG. 5 shows a further embodiment of the present invention, sprocket 200. In this embodiment, the sprocket 200 does not have the inclined root surface or tooth space clearance of the embodiment shown in FIG. 4.

Figure 6:
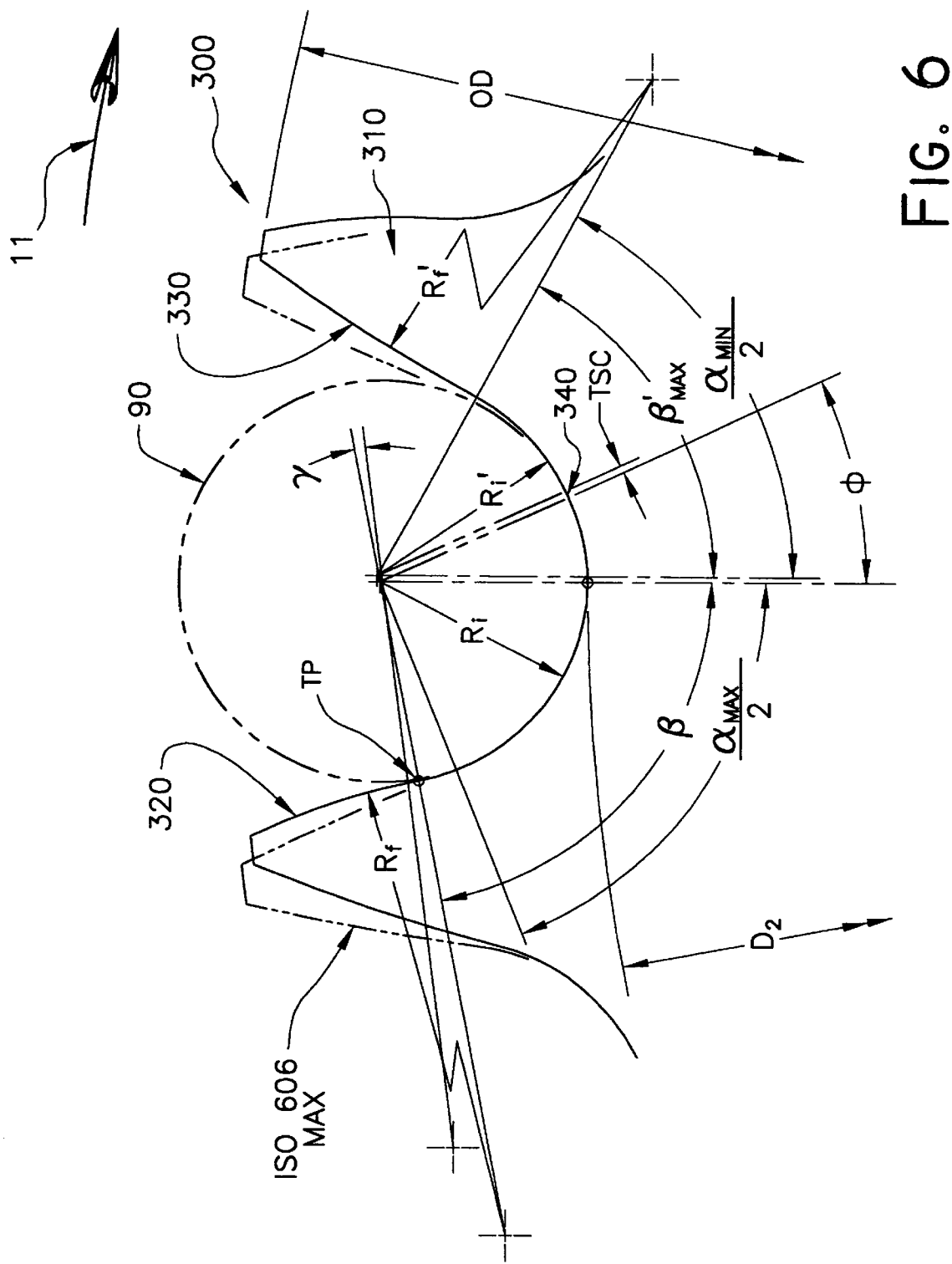
FIG. 6 shows an asymmetrical profile for a 25-tooth driving sprocket having an "uphill" inclined root surface that is outside the ISO envelope.
Figure 6A:
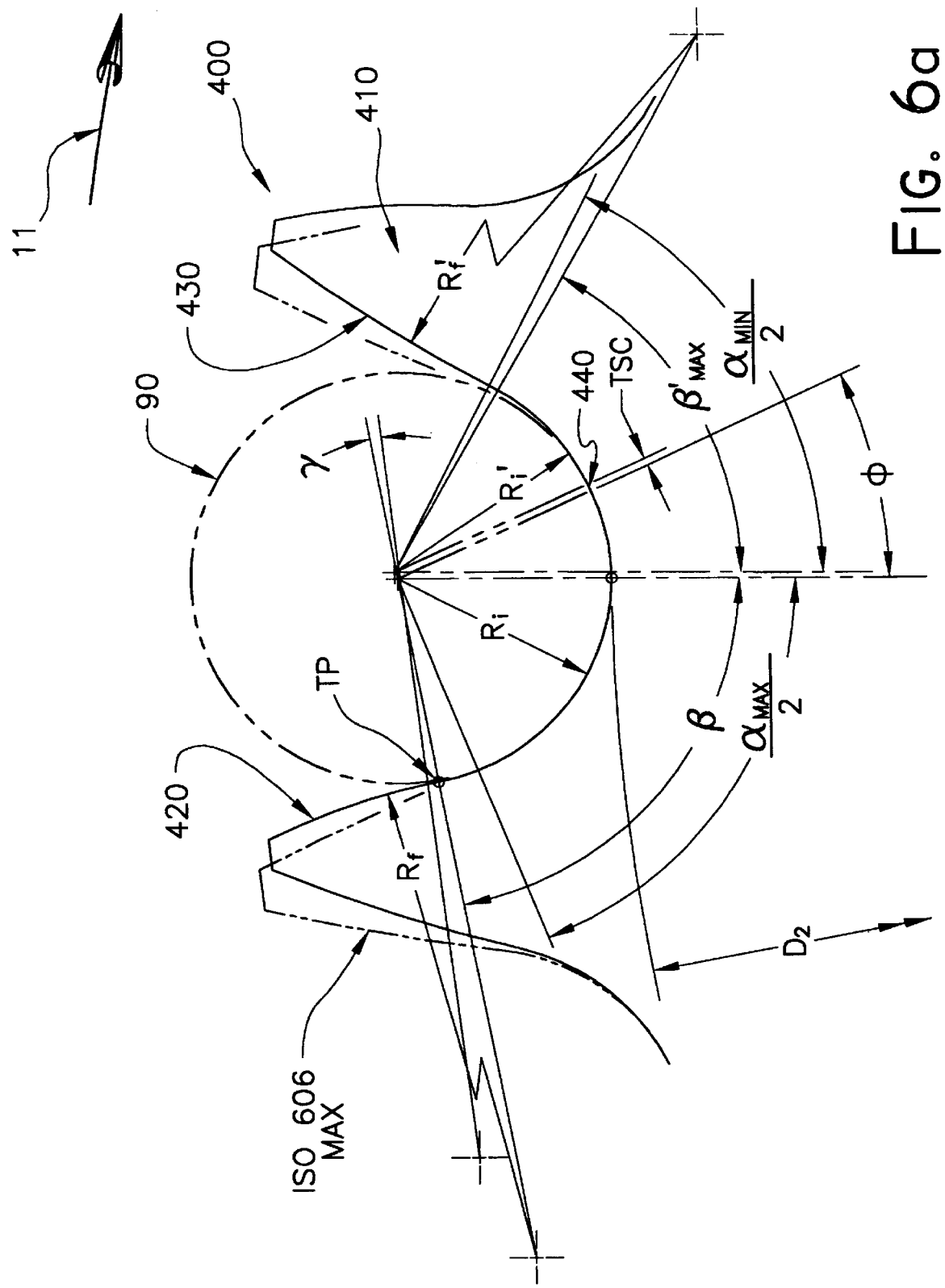
FIG. 6a shows selected portions of an asymmetrical profile for a 25-tooth driving sprocket having an "uphill" inclined root surface that is outside the ISO envelope.

FIG. 6 shows selected portions of a 25-tooth asymmetrical driving sprocket 300 according to the present invention that is outside the ISO specifications. Specifically, in this embodiment, angle $\beta$ is greater than $\alpha_{max}/2$. A maximum value for angle $\beta'$ for the adjacent tooth, shown in FIG. 6 as $\beta'_{max}$, is equal to $\alpha_{min}/2$. This arrangement produces improved NVH characteristics, as the pressure angle $\gamma$, and thus the impact energy $E_A$ for the chain drive are reduced. In another embodiment, shown in FIG. 6a, a maximum value for $\beta'$ for sprocket 400, shown as $\beta'_{max}$, is less than $\alpha_{min}/2$. Like the sprocket 300 shown in FIG. 6, sprocket 400 of FIG. 6a also falls outside the ISO specifications.

Figure 7:
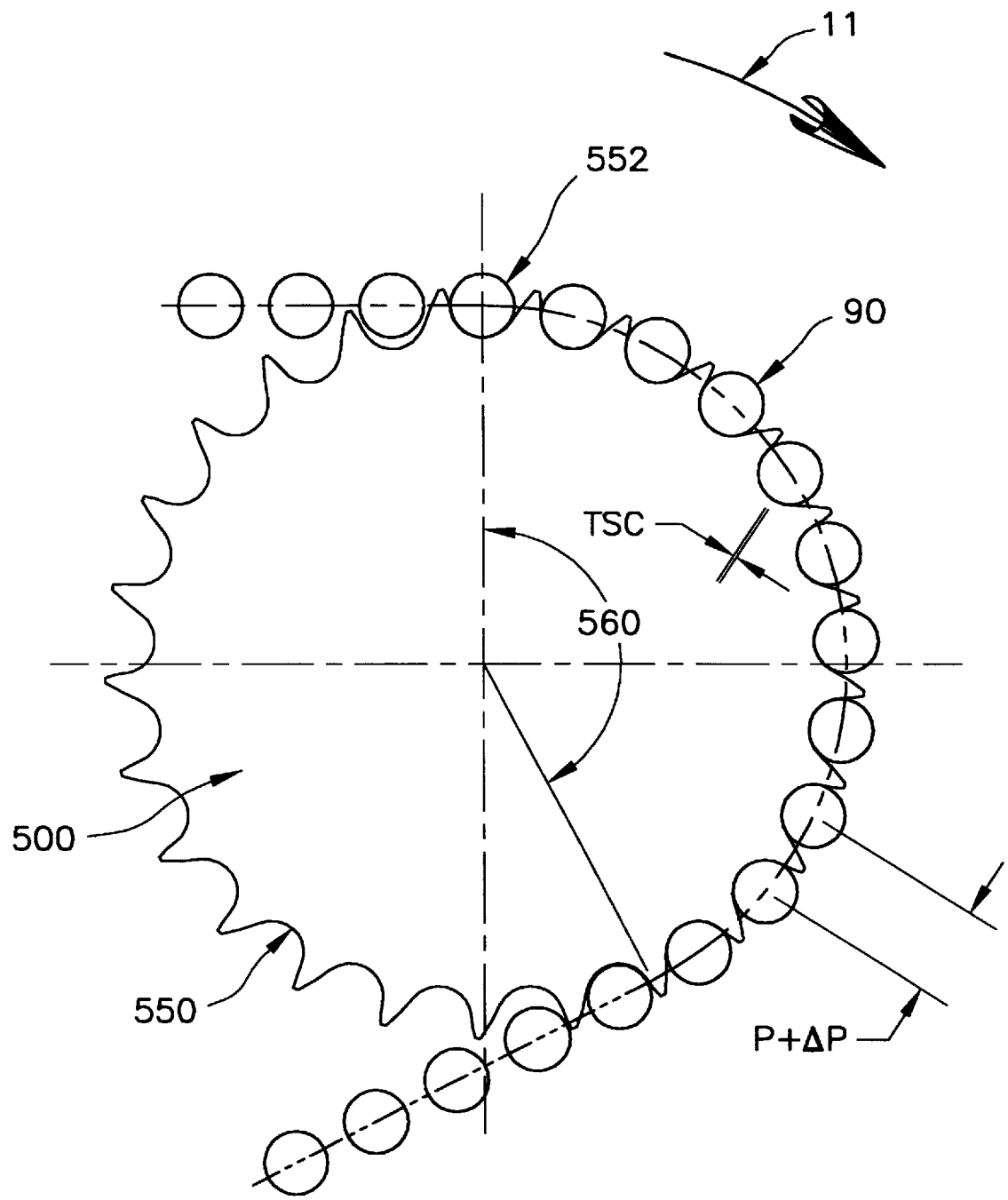
FIG. 7 illustrates a chain wrap associated with a 25-tooth driving sprocket engaged with a chain having an elongated pitch.
Figure 7A:
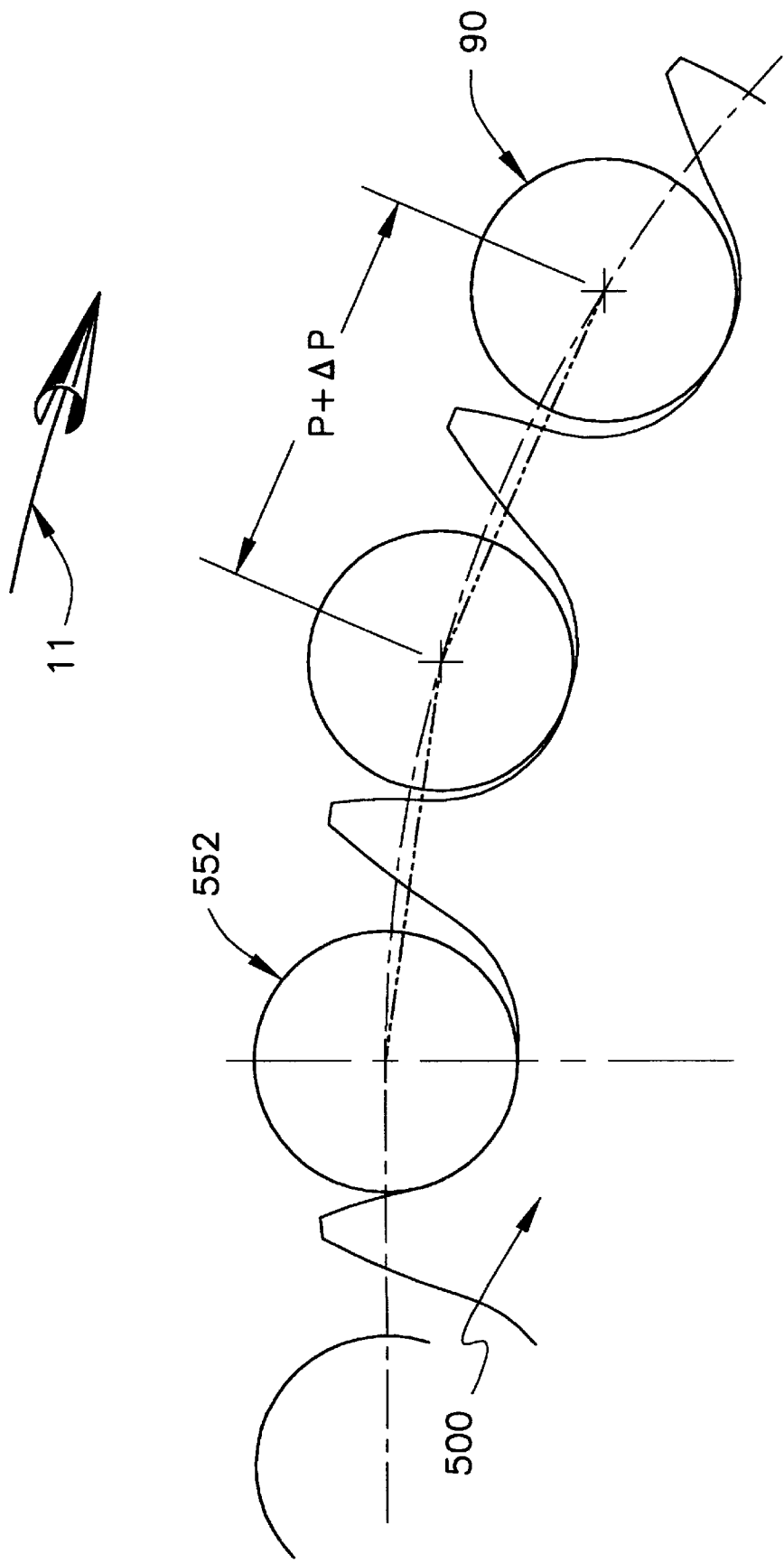
FIG. 7a illustrates an enlarged view of the engaging roller shown in FIG. 7.

FIG. 7 shows the roller chain wrap for an asymmetrical profile for a 25-tooth driving sprocket 500 in a 25/50-tooth sprocket chain drive system. A new chain at theoretical pitch would have all rollers 90 in contact with the root surfaces 550 of a max tooth-profile sprocket for the full wrap 560. For a worn chain, only the first roller to engage such a sprocket, engaging roller 552, would be fully seated in driving contact and the remaining rollers in the wrap would progressively ride up the root surfaces 550. The sprocket 500 of FIG. 7 provides tooth space clearance TSC to accommodate a specified degree of chain pitch elongation $\Delta$P. In other words, the tooth space clearance TSC enables rollers of a worn chain to be maintained in hard contact with the inclined root surfaces of the as the rollers travel around the wrap. FIG. 7a more clearly shows the progression of the rollers 90 in the tooth spaces as the rollers travel around the sprocket 500 in the wrap.

Thus far the invention with all of its advantages has been described as having an inclined root surface that is disposed radially outward in the direction of the sprocket's disengaging flank, or "uphill." In a more preferred embodiment, such as that shown in FIG. 8, the inclined root surface for the driving sprocket is reversed. Specifically, the inclined root surface 640 of driving sprocket 600 is disposed radially inward from the engaging flank 620 to the disengaging flank 630 of the tooth space, or "downhill." In other words, the inclined surface 640 defines a decreasing root surface.

Figure 1:
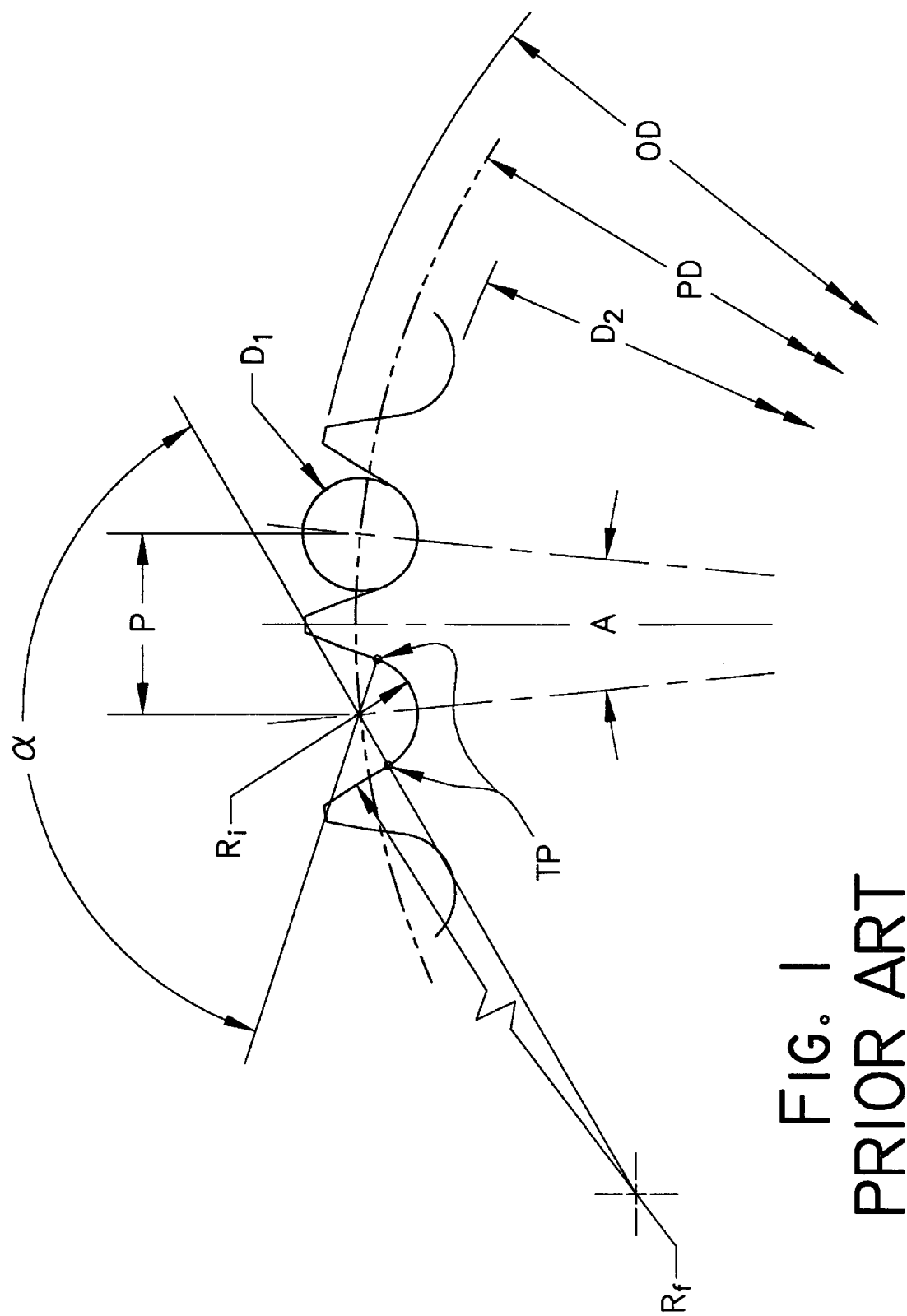
FIG. 1 is a front view of selected portions of the ISO 606 conventional roller chain sprocket tooth profile.
Figure 2:
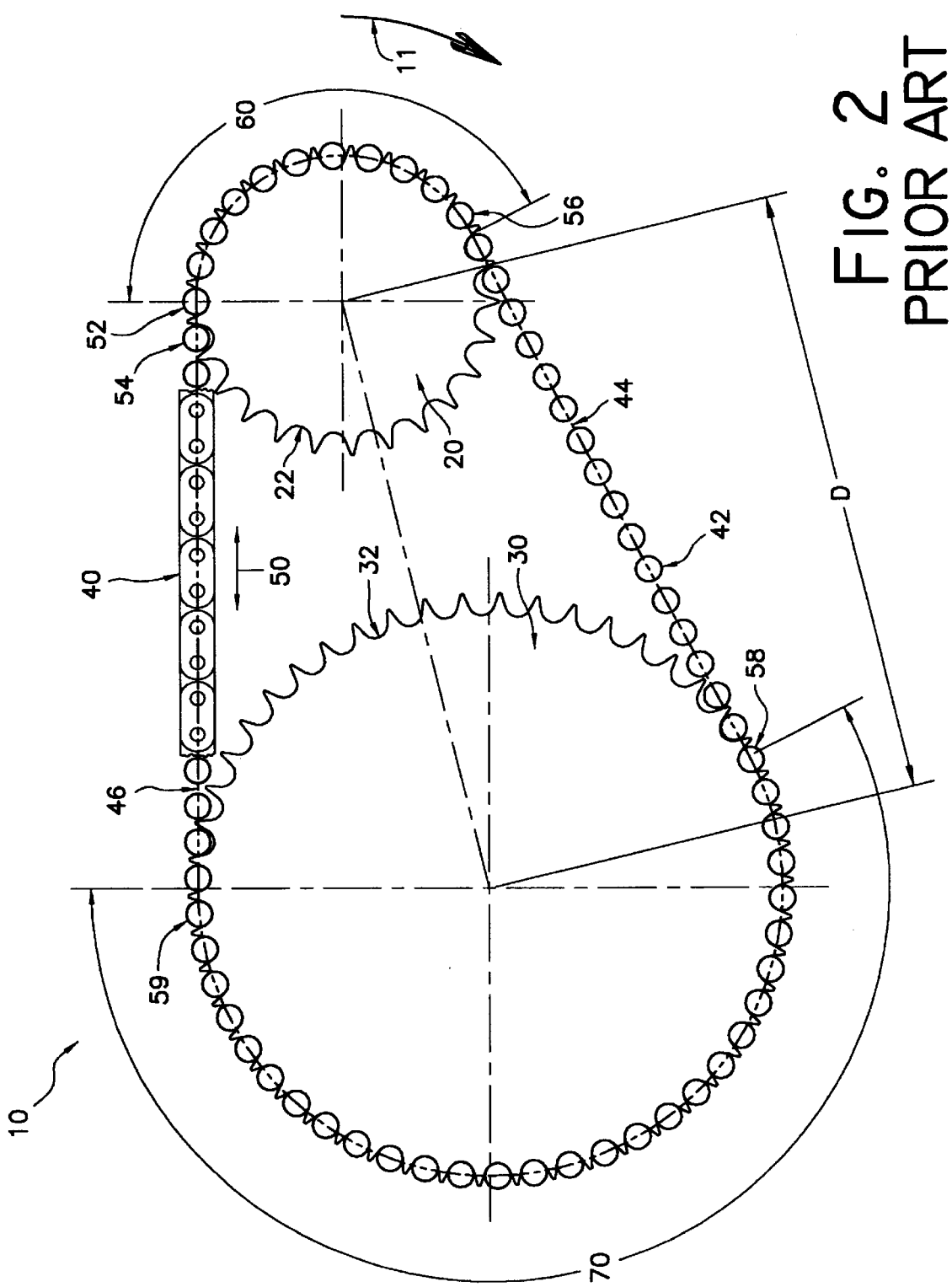
FIG. 2 is a front view of a conventional cam-in-block chain drive system without a tensioner or guide chain.

Referring again to FIG. 1, the ISO standard sprocket captures the chain rollers in the valley of the root radius $R_i$ as the teeth and rollers mesh. Therefore, the rollers impact the root radius $R_i$ at the root diameter $D_2$, producing the radial reaction force $F_R$ shown in FIG. 3. The asymmetrical tooth profile incorporating a "downhill" inclined root surface provides for improved meshing at engagement. Specifically, the roller progression is downhill for a worn chain as its rollers travel around the wrap. In this arrangement, it is believed that the radial reaction force $F_R$ is reduced and a degree of damping will occur, with the chain link plates absorbing the difference between $F_R$ (ISO) and $F_\phi$, shown in FIG. 8.

The "downhill" inclined root feature would, however, move the sprocket pitch circle radially inward with chain wear. Accordingly, a greater amount of tooth space clearance is required to maintain hard roller contact (for the same chain pitch elongation compensation) than with the "uphill" root surface arrangement.

Referring again to FIG. 8, an asymmetrical profile for a 25-tooth "downhill" sprocket 600 according to the present invention is shown. The roller seating angle $\beta$ of driving sprocket 600 is greater than the ISO $\alpha_{max}/2$ at a maximum material condition, and can be increased to the point where the pressure angle $\gamma$ is equal to zero. FIG. 16 lists several profiles having pressure angles $\gamma$ that are reduced from the ISO $\gamma$ angles, the selection of which would be determined by that pressure angle found to be the most beneficial for a specific chain drive. It is contemplated that other angles less than the ISO $\gamma$ may also be beneficially used.

The roller 90 shown in FIG. 8 has its center on the theoretical pitch circle when it is in contact with the tooth surface at point B. The engaging roller seating radius $R_i$ may equal the disengaging roller seating radius $R_i'$ in conformity with the ISO standard. Accordingly, these radii would be slightly larger than a maximum roller radius. A further embodiment would have the roller center on the theoretical pitch diameter when the roller is seated on the root diameter $D_2$. Yet another embodiment would place the roller center on the theoretical pitch diameter when the roller contacts the root surface at some point between point B and $D_2$.

Figure 9:
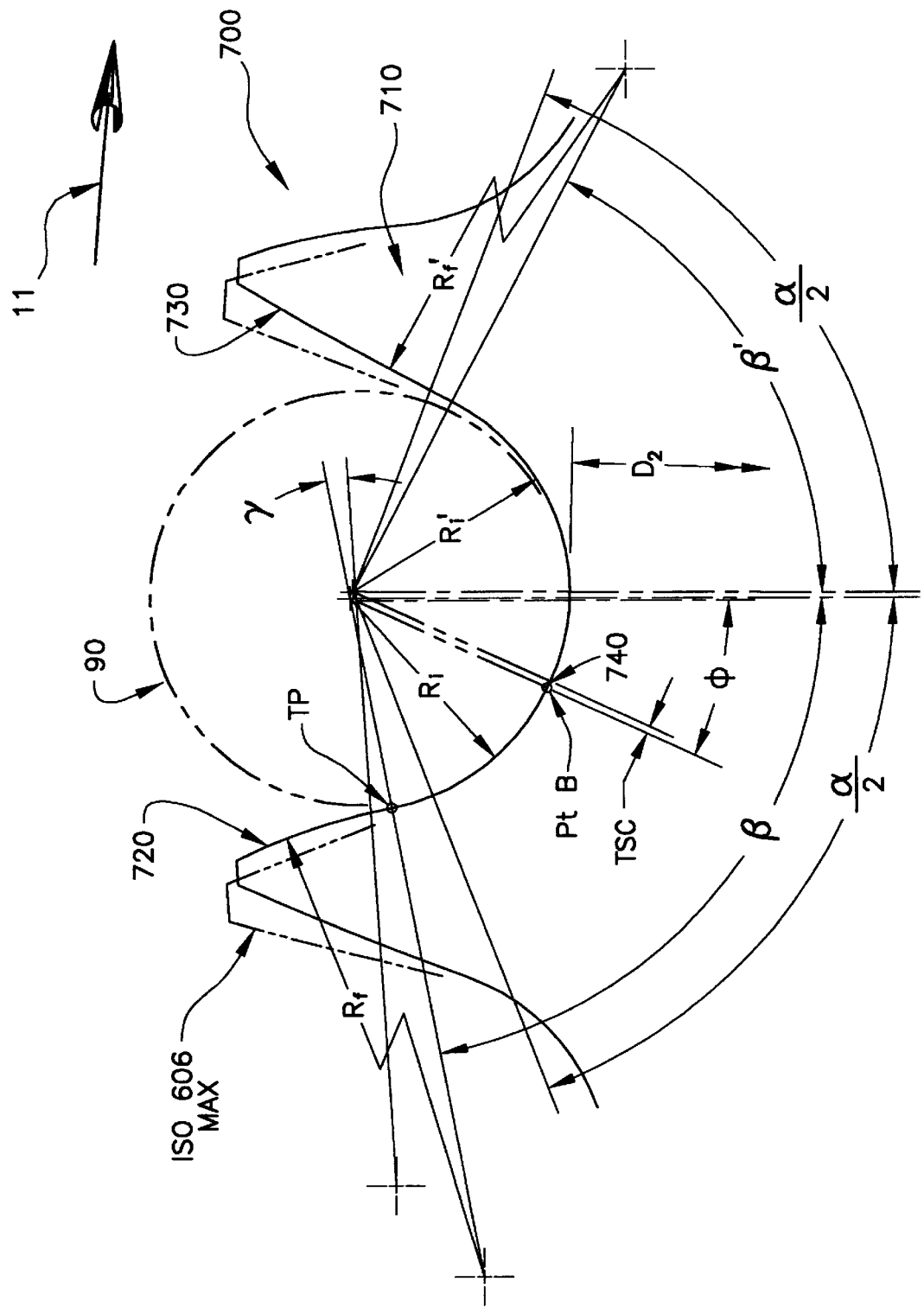
FIG. 9 shows selected portions of an asymmetrical profile for a 50-tooth driven sprocket having an "uphill" inclined root surface feature.

FIG. 9 shows an asymmetrical tooth profile for a 50-tooth driven sprocket 700 incorporating an "uphill" inclined root surface 740. Whether the incline orientation is considered uphill or downhill is a function of the incline surface position with respect to the roller when the roller is in the driving contact. For the embodiment shown in FIG. 9, the inclined root surface is disposed radially outward from the disengaging (drive) flank 730 to the engaging flank 720. Accordingly, the roller enters the driven sprocket wrap from the slack strand to a downhill incline which is advantageous for reduced radial impact, but the roller progression in the wrap as the chain wear occurs is radially outward in the preferred direction, or uphill, from the driving contact position.

Figure 10:
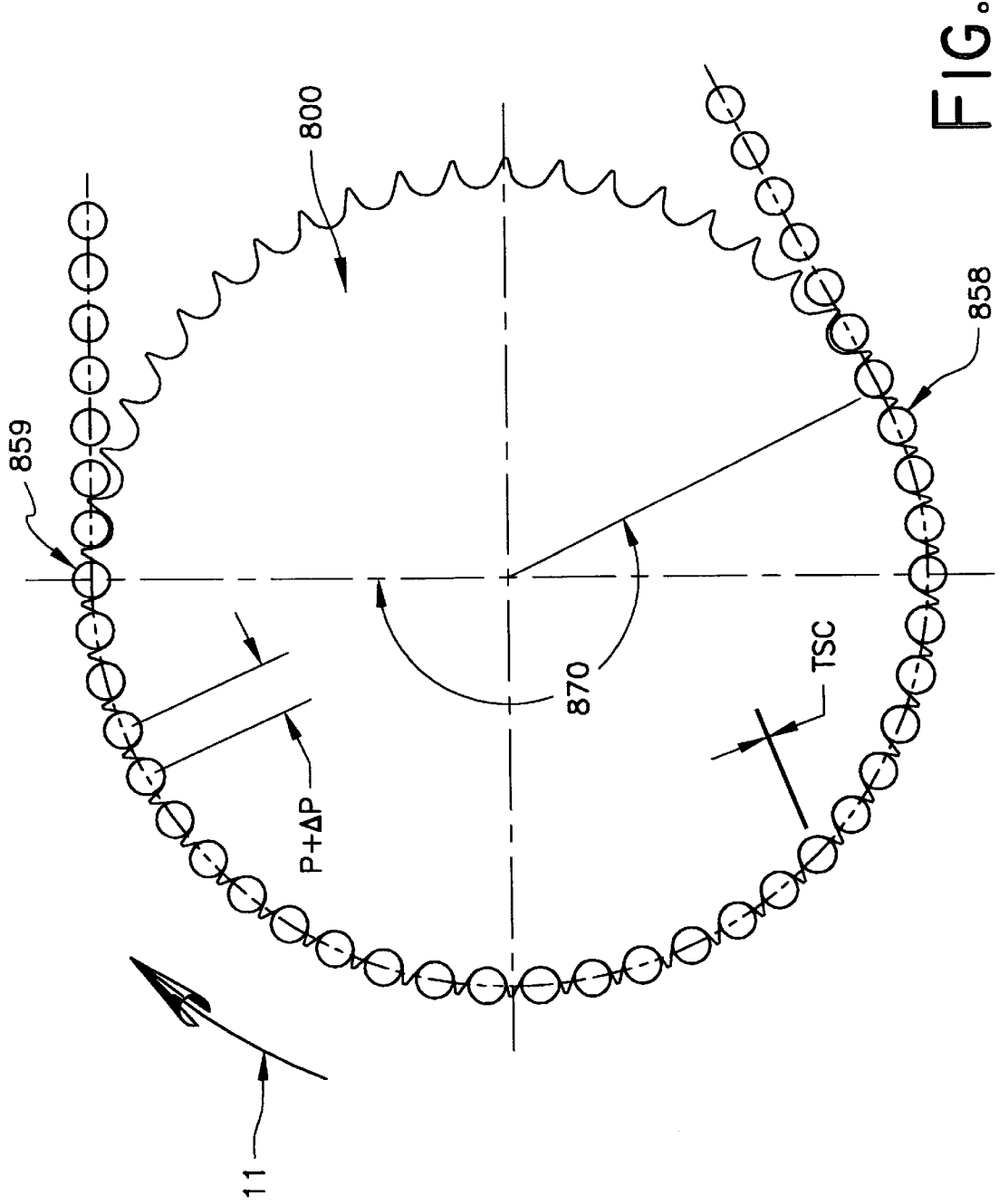
FIG. 10 illustrates a chain wrap associated with a 50-tooth driven sprocket.

In the embodiment shown in FIG. 9, the engaging roller seating angle β is greater than $\alpha_{max}/2$, and the disengaging roller seating angle β' is less than $\alpha_{min}/2$. Roller 90 and coast flank 720 contact at the onset of engagement will theoretically occur only when chain wear is at the maximum chain pitch elongation ΔP. A new chain at theoretical pitch P would have all rollers in contact with root diameter $D_2$ of the sprocket 700 shown in FIG. 9 for a max material sprocket. FIG. 10 shows the wrap angle 870 for a 50-tooth driven sprocket 800 with tooth space clearance TSC in a 25/50-tooth sprocket chain drive system. FIG. 10 also shows the corresponding chain pitch elongation ΔP that can be accommodated.

FIG. 16 lists the maximum engaging side roller seating angles β and related pressure angles γ for three families of asymmetrical profiles according to the present invention. These pressure angles γ are described according to the number of sprocket teeth Z and corresponding tooth angle A, and the engaging side roller seating angle β, as contrasted to the pressure angle values for the ISO-606 compliant tooth profiles listed in FIG. 15. The asymmetrical profiles are merely illustrative of sprockets according to the present invention; therefore, alternative sprockets having other profiles may have better NVH characteristics for a specific drive. However, empirical analysis demonstrates that engagement noise levels decrease for the asymmetrical profiles as the pressure angle γ is reduced from the ISO standard.

Figure 11:
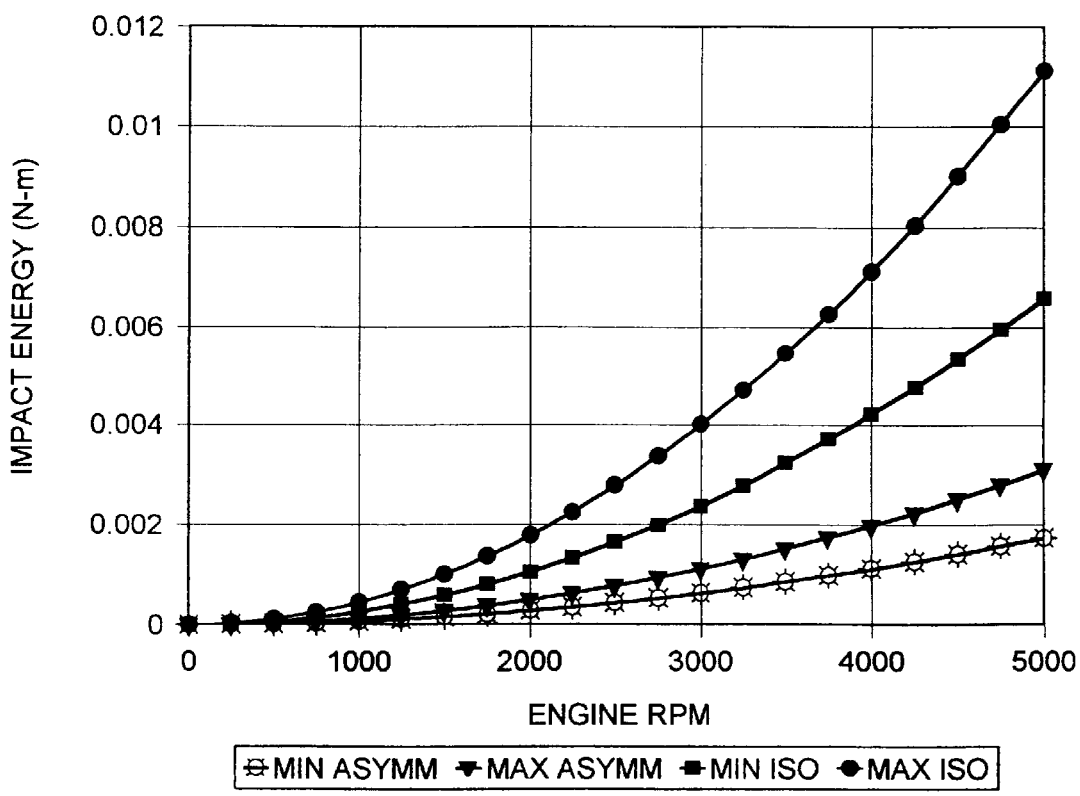
FIG. 11 graphically illustrates, for several 25-tooth sprockets, the impact energy that must be absorbed during chain engagement as a function of engine speed.

FIG. 11 graphically illustrates the impact energy $E_A$ as a function of engine speed during the engagement of an 8 mm pitch roller chain to a 25-tooth sprocket. The four $E_A$ curves shown are for ISO maximum and minimum pressure angles, and asymmetrical maximum and minimum pressure angles. These curves represent the theoretical case for maximum and minimum material sprockets and a chain at theoretical pitch. The maximum impact energy level for the asymmetrical (MAX ASYM) profile is less than the ISO maximum (MAX ISO) as well as the ISO minimum (MIN ISO).

Figure 12:
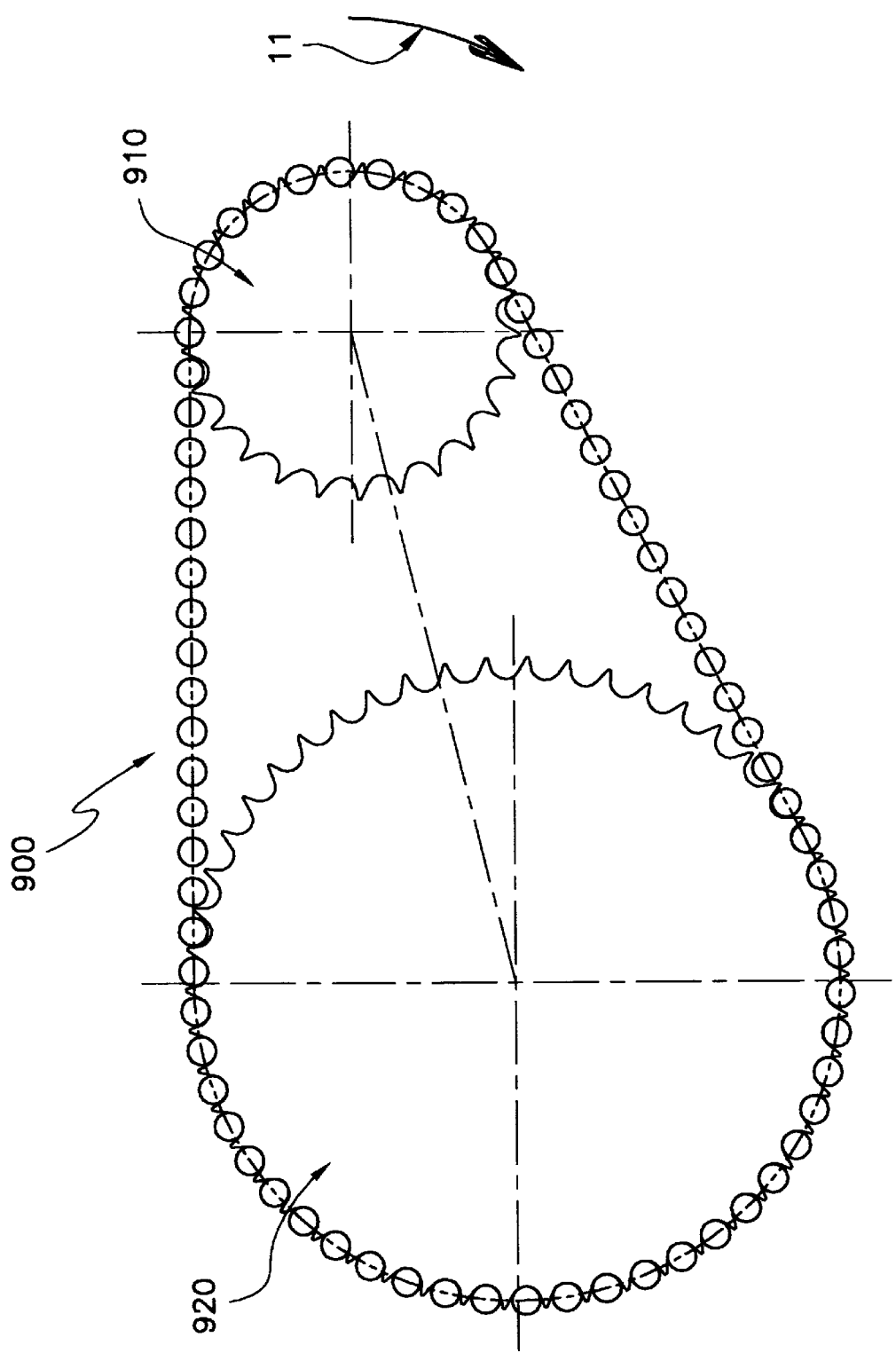
FIG. 12 shows a cam-in-block camshaft chain drive system using asymmetrical tooth profile sprockets in a 25/50-tooth combination.

FIG. 12 shows a typical cam-in-block camshaft chain drive system 900 using asymmetrical tooth profile sprockets in a 25/50-tooth sprocket combination. The 25-tooth drive sprocket 910 for this chain drive arrangement is fastened to a crankshaft and, accordingly, runs at crankshaft speed. The 50-tooth driven sprocket 920, which is fastened to a camshaft, runs at half-crankshaft speed.

Figure 13:
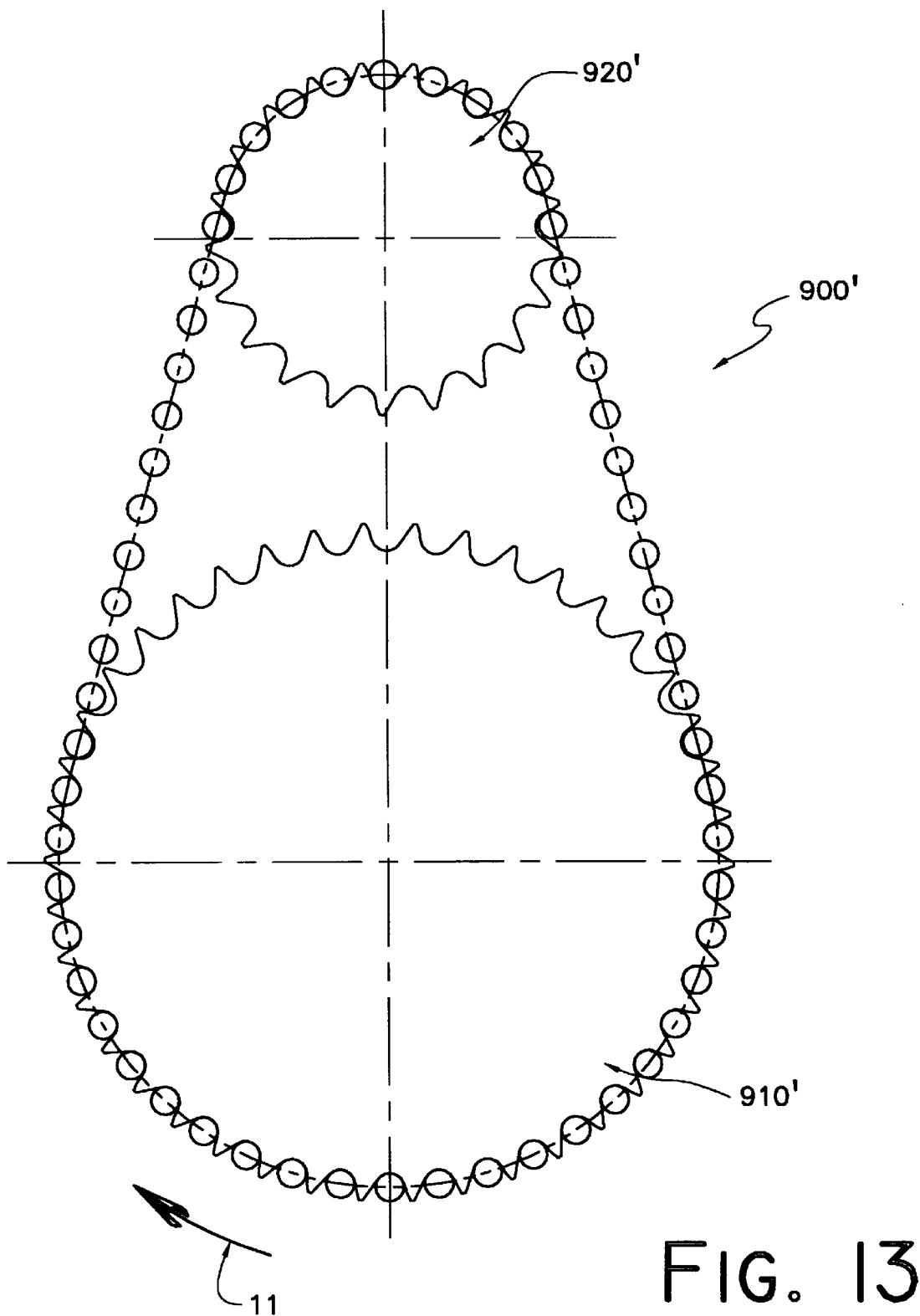
FIG. 13 shows a chain drive system using asymmetrical tooth profile sprockets in a 42/21-tooth combination.

Another chain drive application for asymmetrical-profile sprockets is a balance shaft drive 900' as shown in FIG. 13. The 42-tooth drive sprocket 910' is fastened to a crankshaft. The 21-tooth driven sprocket 920' is fastened to the balance shaft, and will, therefore, run at twice crankshaft speed. In this arrangement, the driven shaft will normally drive a second counter-rotating balance shaft through a 1:1 gear drive.

Figure 14:
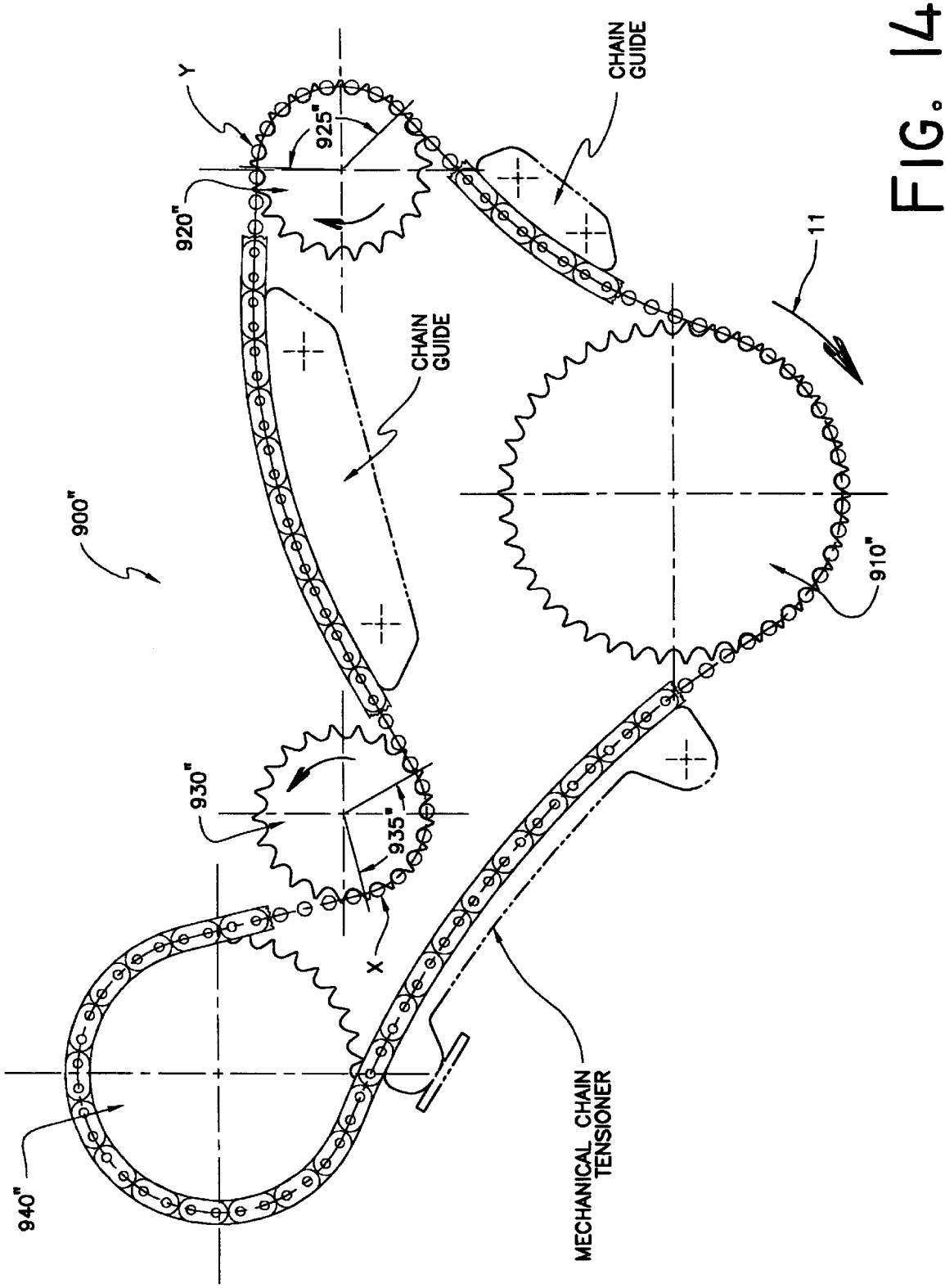
FIG. 14 shows another chain drive system using asymmetrical tooth profile sprockets in a 42/21-tooth combination.

FIG. 14 shows another typical balance shaft drive 900" using the same 42/21-tooth sprocket combination in a 4-sprocket chain drive system, which uses an idler sprocket 940" to achieve the reverse rotation of the balance shafts. Balance shaft sprockets 920" and 930" are fastened to counter-rotating balance shafts that run at twice crankshaft speed serving to counterbalance the second order free (out-of-balance) forces for an in-line 4-cylinder engine. Rollers X and Y are the engaging rollers for the right hand and left hand balance shaft sprockets 930" and 920", respectively. It is preferable not to have roller engagement occurring at the same instant, and this can be managed by slightly changing the chain geometry by increasing or decreasing the chain strand offset between the two sprockets, for instance. Although the 21-tooth sprockets 930" and 920" contribute a greater degree to the overall noise levels, all 4 sprockets contribute as a consequence of roller-sprocket meshing. So, it is preferable to design the drive to stagger the roller meshing for all the sprockets.

The tooth profile features shown and described above can be altered slightly without substantially deviating from the chain and sprocket meshing kinematics that produce the noise reduction advantages with this invention. For example, slight changes to the profile might be done for manufacturing, quality control reasons, or to improve part dimensioning. Another example would be to approximate the engaging asymmetrical flank profile by an involute form, and the disengaging asymmetrical flank profile could be approximated by a different involute form. These changes are within the scope of the invention as disclosed herein.

The above description merely provides a disclosure of particular embodiments of the invention and is not intended for the purposes of limiting the same thereto. As such, the invention is not limited to only the described embodiments. Rather, it is recognized that one skilled in the art could conceive alternative embodiments that follow within the scope of the invention.

Having thus described the invention, it is claimed:

1. A roller chain sprocket comprising:
   a plurality of sprocket teeth each having an engaging side and a disengaging side, the engaging sides cooperating with the disengaging sides of adjacent sprocket teeth to define asymmetrical tooth spaces for receiving rollers associated with a roller chain, the rollers and the engaging sides striking together during rotation of the sprocket, and at least one of the asymmetrical tooth spaces being defined by an engaging side roller seating angle (β) that is greater than a disengaging side roller seating angle (β').

2. The sprocket of claim 1, wherein:

$$\beta \geq \alpha_{NOMINAL}/2,$$

where $\alpha_{NOMINAL}$ is a nominal ISO-606-1994(E) roller seating angle.

3. The sprocket of claim 1, wherein:

$$\alpha_{MAX}/2 \geq \beta \geq \alpha_{NOMINAL}/2,$$

where $\alpha_{NOMINAL}$ is a nominal ISO-606-1994(E) roller seating angle and $\alpha_{MAX}$ is a maximum ISO-606-1994(E) roller seating angle.

4. The sprocket of claim 1, wherein:

$$\beta' \leq \alpha_{NOMINAL}/2,$$

where $\alpha_{NOMINAL}$ is a nominal ISO-606-1994(E) roller seating angle.

5. The sprocket of claim 1, wherein:

$$\alpha_{MIN}/2 \leq \beta' \leq \alpha_{NOMINAL}/2,$$

where $\alpha_{NOMINAL}$ is a nominal ISO-606-1994(E) roller seating angle and $\alpha_{MIN}$ is a minimum ISO-606-1994(E) roller seating angle.

6. The sprocket of claim 1, wherein:

$$\beta \geq \alpha_{NOMINAL}/2,$$

and $$\beta' \leq \alpha_{NOMINAL}/2,$$

where $\alpha_{NOMINAL}$ is a nominal ISO-606-1994(E) roller seating angle.

7. The sprocket of claim 1, wherein:

$$\alpha_{MAX}/2 \geq \beta \geq \alpha_{NOMINAL}/2,$$

and $$\alpha_{MIN}/2 \leq \beta' \leq \alpha_{NOMINAL}/2,$$

where $\alpha_{NOMINAL}$ is a nominal ISO-606-1994(E) roller seating angle, $\alpha_{MAX}$ is a maximum ISO-606-1994(E) roller seating angle, and $\alpha_{MIN}$ is a minimum ISO-606-1994(E) roller seating angle.

8. The sprocket of claim 1, wherein the asymmetrical tooth spaces are further defined by engaging side pressure angles ($\gamma$) that are each less than or equal to a nominal ISO-606-1994(E) pressure angle.

9. The sprocket of claim 8, wherein:
the engaging side pressure angles ($\gamma$) are in the range of zero (0) to the nominal ISO-606-1994(E) pressure angle, and
$\beta' \leq \alpha_{NOMINAL}/2$, where $\alpha_{NOMINAL}$ is a nominal ISO-606-1994(E) roller seating angle.

10. The sprocket of claim 1, wherein the asymmetrical tooth spaces are further defined by a root radius having a first end tangent to an engaging flank and a second end tangent to a disengaging flank, and wherein the engaging side roller seating angle ($\beta$) defines a first arc segment of the root radius and the disengaging side roller seating angle ($\beta'$) defines a second arc segment of the root radius.

11. The sprocket of claim 1, wherein the asymmetrical tooth spaces are further defined by:
a first root radius having a first end tangent to an engaging flank and a second end tangent to a flat root surface, and
a second root radius having a first end tangent to a disengaging flank and a second end tangent to the flat root surface, the flat root surface providing tooth space clearance to facilitate maintaining the rollers in hard contact with the sprocket during rotation thereof.

12. The sprocket of claim 11, wherein the flat root surface extends radially outward toward the engaging flank.

13. The sprocket of claim 11, wherein the flat root surface extends radially outward toward the disengaging flank.

14. The sprocket of claim 1, wherein each of the asymmetrical tooth spaces is defined by an engaging side roller seating angle ($\beta$) that is greater than a disengaging side roller seating angle ($\beta'$).

15. A unidirectional roller chain drive system comprising:
a driving sprocket having a plurality of sprocket teeth each having an engaging side and a coast side, the engaging sides cooperating with the coast sides of adjacent sprocket teeth to define first asymmetrical tooth spaces;
a driven sprocket having a plurality of sprocket teeth each having an engaging side and a coast side, the engaging sides cooperating with the coast sides of adjacent sprocket teeth to define second asymmetrical tooth spaces;
a roller chain having rollers which impact with the engaging sides of the driving sprocket and the driven sprocket during rotation of the sprockets; and
at least one asymmetrical tooth space of the first and second asymmetrical tooth spaces being defined by an engaging side roller seating angle ($\beta$) that is greater than a disengaging side roller seating angles ($\beta'$).

16. The drive system of claim 15, wherein:

$$\beta \geq \alpha_{NOMINAL}/2,$$

and $$\beta' \leq \alpha_{NOMINAL}/2,$$

where $\alpha_{NOMINAL}$ is a nominal ISO-606-1994(E) roller seating angle.

17. The drive system of claim 15, wherein:

$$\alpha_{MAX}/2 \geq \beta \geq \alpha_{NOMINAL}/2,$$

and $$\alpha_{MIN}/2 \leq \beta' \leq \alpha_{NOMINAL}/2,$$

where $\alpha_{NOMINAL}$ is a nominal ISO-606-1994(E) roller seating angle, $\alpha_{MAX}$ is a maximum ISO-606-1994(E) roller seating angle, and $\alpha_{MIN}$ is a minimum ISO-606-1994(E) roller seating angle.

18. The drive system of claim 15, wherein the at least one asymmetrical tooth spaces being further defined by an engaging side pressure angle ($\gamma$) that is less than or equal to a nominal ISO-606-1994(E) pressure angle.

19. The drive system of claim 18, wherein:
the engaging side pressure angle ($\gamma$) is in the range of zero (0) to the nominal ISO-606-1994(E) pressure angle, and
$\beta' \leq \alpha_{NOMINAL}/2$, where $\alpha_{NOMINAL}$ is a nominal ISO-606-1994(E) roller seating angle.

20. The drive system of claim 15, wherein the at least one asymmetrical tooth space is further defined by:
a root radius having a first end tangent to an engaging flank and a second end tangent to a disengaging flank, and
the engaging side roller seating angle ($\beta$) defines a first arc segment of the root radius and the disengaging side roller seating angle ($\beta'$) defines a second arc segment of the root radius.

21. The drive system of claim 15, wherein the at least one asymmetrical tooth space is further defined by:
a first root radius having a first end tangent to an engaging flank and a second end tangent to a flat root surface, and
a second root radius having a first end tangent to a disengaging flank and a second end tangent to the flat root surface, the flat root surface providing tooth space clearance to facilitate maintaining the rollers in hard contact with the sprocket during rotation thereof.

22. The drive system of claim 15, wherein each of the first asymmetrical tooth spaces is defined by an engaging side roller seating angle ($\beta$) that is greater than a disengaging side roller seating angles ($\beta'$).

23. The drive system of claim 15, wherein each of the second asymmetrical tooth spaces is defined by an engaging side roller seating angle ($\beta$) that is greater than a disengaging side roller seating angles ($\beta'$).

24. The drive system of claim 15, wherein each of the first and second asymmetrical tooth spaces is defined by an engaging side roller seating angle ($\beta$) that is greater than a disengaging side roller seating angles ($\beta'$).

* * * * *